United States Patent [19]

Acampora

[11] Patent Number: 4,726,040
[45] Date of Patent: Feb. 16, 1988

[54] BURST DEMODULATOR

[75] Inventor: Anthony Acampora, Freehold, N.J.

[73] Assignee: American Telephone and Telegraph Company, AT&T Bell Laboratories, Murray Hill, N.J.

[21] Appl. No.: 15,544

[22] Filed: Feb. 13, 1987

Related U.S. Application Data

[63] Continuation of Ser. No. 658,772, Oct. 9, 1984, abandoned.

[51] Int. Cl.[4] ............................................. H03K 9/00
[52] U.S. Cl. ........................................ 375/75; 370/84; 329/104
[58] Field of Search .................. 370/84, 91, 93, 104; 375/75, 106, 94; 329/104; 455/12

[56] References Cited

U.S. PATENT DOCUMENTS

| | | | |
|---|---|---|---|
| 3,665,417 | 5/1972 | Low et al. | 370/84 |
| 4,002,845 | 1/1977 | Kaul et al. | 375/106 |
| 4,021,609 | 5/1977 | Oyama et al. | 375/114 |
| 4,230,911 | 10/1980 | Felliriger et al. | 370/84 |
| 4,232,197 | 11/1980 | Acampora et al. | 370/97 |
| 4,355,388 | 10/1982 | Deal, Jr. | 370/104 |
| 4,408,322 | 10/1983 | Chadwick et al. | 370/104 |
| 4,453,259 | 6/1984 | Miller | 375/106 |

OTHER PUBLICATIONS

Sargeaunt, ICC 77, Chicago, Ill., Jun. 12-15, 1977, vol. 3, pp. 45.2-184 to 45.3-187.
Tsuji et al, 4th Internat. Conf. Digital Satellite Comm., Montreal, Canada, Oct. 23-25, 1978, pp. 101-107.
Acampora et al, IEEE Trans. Comm., vol. COM-17, No. 10, Oct. 1979, pp. 1496-1503.
Reisenfeld, ICC 82, Phila., Pa., Jun. 13-17, 1982, vol. 3, pp. 5E.3.1-5E.3.4.
Wallace, ICC 83, Boston, Mass., Jun. 19-20, 1983, vol. 1, pp. B2.6.1-B2.6.5.

*Primary Examiner*—Robert L. Griffin
*Assistant Examiner*—Stephen Chin
*Attorney, Agent, or Firm*—Erwin W. Pfeifle

[57] ABSTRACT

The present invention relates to a burst demodulator for use, for example, in a TDMA communication system, which comprises a first section that downconverts a received r-f burst sequence signal to an approximate baseband signal with a local oscillator, samples the baseband signal at a predetermined rate, and converts the analog samples into an equivalent digital signal. A second section comprises a memory for storing the digital signals associated with a particular burst in a predetermined time period, and a slow-speed processor for reconstructing the received burst signal from the stored information and processing the reconstructed signal to provide for carrier and clock recovery, start-of-message identification, data detection, etc.

6 Claims, 3 Drawing Figures

BURST DEMODULATOR

This application is a continuation of application Ser. No. 658,772, filed Oct. 9, 1984, now abandoned.

TECHNICAL FIELD

The present invention relates to a burst demodulator and, more particularly, to a burst demodulator which can be used in a TDMA communication system and which receives an incoming r-f digital signal comprising an analog waveform which is downconverted to a baseband signal using a local oscillator. The baseband signal is low-pass filtered and sampled at a predetermined rate, with the samples converted to an equivalent digital signal and stored in a memory. The stored samples are then processed in a slow-speed processor to provide, for example, carrier and clock recovery, start of message identification, data detection, etc.

DESCRIPTION OF THE PRIOR ART

In a time division multiple access (TDMA) communication system, each terminal station is assigned to separate time slot for transmitting a burst of information to another terminal station. Each terminal station must also be capable of receiving a high-speed burst of information assigned to it and recover the information therefrom for delivery to the proper end user.

U.S. Pat. No. 4,232,197 issued to A. Acampora et al on Nov. 4, 1980, discloses a processor for a TDMA burst modem which, in FIG. 4 thereof, receives an r-f digital signal and, in a demodulator, downconverts the received signal to baseband while recovering the bits of the received signal. The output from the demodulator is transmitted to processing circuitry which determines the frame or superframe markers in the received bits and only permits the decoded bits to be gated into a memory during a period which starts before and ends after the expected arrival of an assigned burst of information. Slow-speed processing then reads the stored bits from memory to find the burst information therein and then processes the found burst information based on preamble information accompanying each burst. This technique was also discussed by A. Acampora et al in the article "Baseband Processing In a High-Speed Burst Modem For a Satellite-Switched TDMA System" in *IEEE Transactions On Communications*, Vol. COM-27, No. 10 October 1979 at pages 1496–1503.

The prior art burst demodulators, however, are expensive and do not lend themselves to provide the ability for use in a communication system wherein the burst demodulator can be modularized to permit growth in associated stages with minimal cost. The problem in the prior art, therefore, is to provide a TDMA burst demodulator which can provide this capability.

SUMMARY OF THE INVENTION

The foregoing problem in the prior art has been solved in accordance with the present invention which relates to a burst demodulator, and more particularly to a burst demodulator which can be used in a TDMA communication system and receives an incoming r-f digital signal, comprising an analog waveform, that is downconverted to a baseband signal using a local oscillator providing a frequency nominally equal to that of the incoming carrier. The baseband signal is then low-pass filtered and sampled at a predetermined rate, with the samples converted to an equivalent digital signal and stored in a memory. The stored samples are then processed in a slow-speed digital processor between burst arrivals to provide, for example, carrier and clock recovery, start of message identification, matched filtering, equalization, decoding, data detection, etc.

It is an aspect of the present invention to provide a burst demodulator for use, for example in a TDMA communcation system, which can be economically expanded to accommodate a user's growth needs. More particularly, the present burst demodulator is designed to require for startup a first module including a downconverting means for converting the r-f digital signal with an analog waveform to baseband, a low-pass filtering means, a sampling means for sampling the baseband signal at a predetermined rate, and a converter for encoding the samples into a digital signal; and a second module comprising a memory for storing the digitized samples and a slow-speed processing arrangement which retrieves the digitized samples stored in the memory and then digitally performs, for example, carrier and clock recovery, start-of-message identification, matched filtering, equalization, decoding, and data detection between burst arrivals. A subsequent increase in growth would only require the addition of a second module coupled in parallel to the initially required second module.

Other and further aspects of the present invention will become apparent during the course of the following description and by reference to the accompanying drawings.

BRIEF DESCRIPTION OF THE DRAWINGS

Referring now to the drawings.

DETAILED DESCRIPTION

Figure 1:
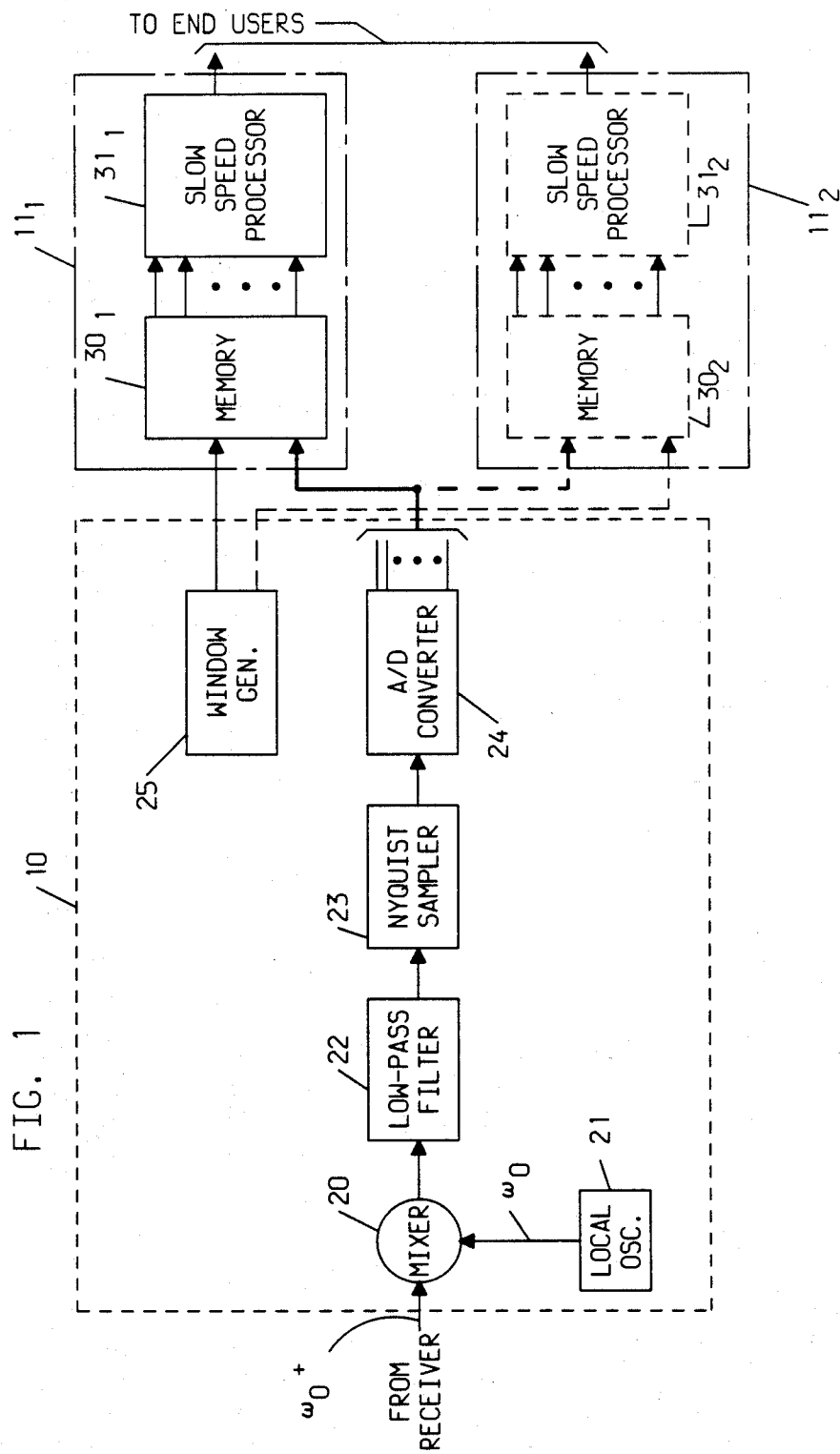
FIG. 1 is a block diagram of an arrangement of the burst demodulator for use in a TDMA communication system in accordance with the present invention.
Figure 2:
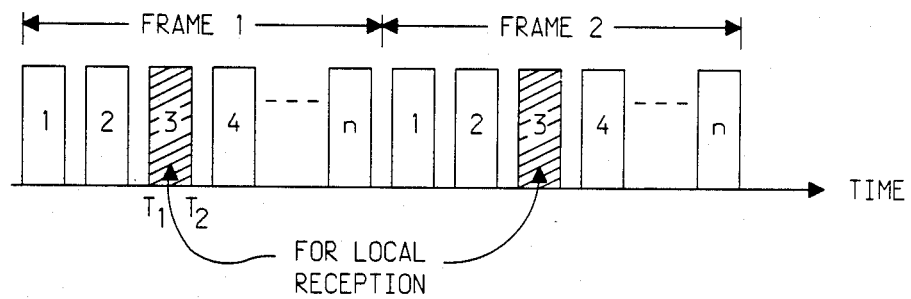
FIG. 2 is exemplary diagram of TDMA bursts of information received within a frame period by the arrangement of FIG. 1 in relation to time, with certain bursts thereof being destined for local reception.

FIG. 1 illustrates a typical arrangement for a burst demodulator in accordance with the present invention. For purposes of explanation hereinafter, the use of the present burst demodulator in only a TDMA communication system will be discussed, but it should be understood that such demodulator could also be used for processing other analog burst signals. The input signal to the burst demodulator of FIG. 1 is received from a receiver front-end and comprises sequential bursts of information in, for example, a TDMA sequence as shown in an exemplary sequence in FIG. 2. In FIG. 2, a certain burst (burst 3) in each frame period is destined for local reception by a particular end user of the arrangement of FIG. 1. It is to be understood that during a typical frame period, one or more bursts can be destined for local reception but that for purposes of explanation hereinafter only one TDMA burst per frame will be so designated. Multiple bursts per frame for local reception will be discussed later to illustrate the flexibility and economy of the present demodulator.

In FIG. 1, the present burst demodulator is sectionalized into a first module 10 and a second module 11 with both modules being coupled in series between the receiver and the associated end user. The input signal is received in the first module 10 where it is applied to a mixer 20. In mixer 20, the input signal, comprising sequential bursts of information, is mixed with a carrier frequency generated by a local oscillator 21 to generate an output signal comprising a downconverted baseband signal along with other products of the mixing process. In accordance with the present invention, the local oscillator 21 carrier frequency is generated to, as closely as possible, correspond to the carrier frequency ($\omega_0$) used in the remote transmitter. However, there will generally be some small deviation ($\delta$) therefrom in phase and/or frequency which need not be corrected to practice the present invention. In other words, carrier recovery need not be performed at this point to downconvert the input signal to baseband. As a result, the output signal from mixer 20 will comprise a frequency band which approximates the baseband.

Figure 3:
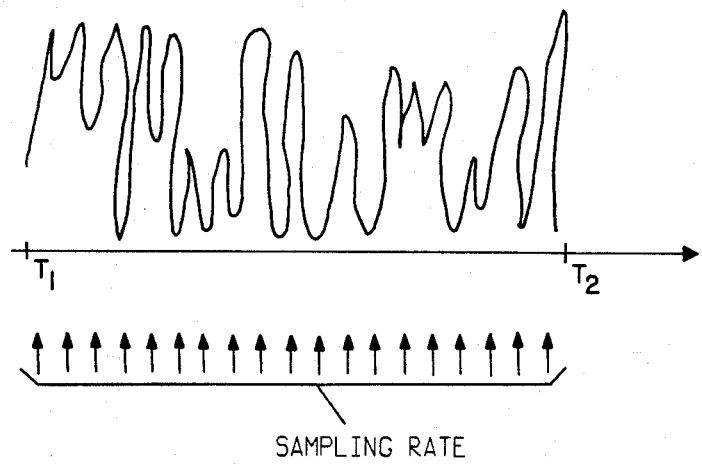
FIG. 3 is an exemplary analog waveform of a received burst of digital information in the burst demodulator of FIG. 1 while illustrating a typical sampling rate performed by the sampler of FIG. 1.

The output signal from mixer 20 is transmitted through a low-pass filtering means 22 which is designed to only pass the baseband frequencies. The filtered output signal from filtering means 22 is then transmitted to a sampling means 23 which samples the baseband input signal at a predetermined rate sufficiently high so as to generate a plurality of associated analog signal samples which contain all the information of the baseband signal rate. More particularly, the sampling rate could be, for example, at twice the nominal bandwidth of the baseband signal. For example, if the bandwidth of the signal if nominally 30 MHz, then the sampling rate will be at least 60 million samples per second. An exemplary analog burst signal and an exemplary sampling rate is depicted in FIG. 3. Each of the samples from sampling means 23 is then transmitted to an analog-to-digital (A/D) converter 24 which converts each analog signal sample, from sampling means 23, into a corresponding digital output signal of X bits as is well known in the art.

A window generator 25 is synchronized, by any well-known technique, to the start of each frame period, and also includes information relating to the start and stop time of any burst of information destined for local reception within each frame period. Such circuits are well known in the art of TDMA processing, and any suitable arrangement can be used. Window generator 25 functions to generate both an enabling signal at the start of a burst of information destined for local reception by the associated receiver, and a disabling signal at the conclusion of that burst of information.

Second module 11, designated $11_1$ for the first of such modules, includes a memory $30_1$ and a slow-speed processing means $31_1$. Memory $30_1$ has as its inputs (1) the continuous output signals from converter 24 and (2) the enabling and disabling signals from window generator 25. When enabled by window generator 25, memory $30_1$ stores the digital signals associated with the samples relating to a burst of information destined for local reception. For the rest of the frame period, memory $30_1$ is disabled by window generator 25 from storing digital signals associated with bursts not destined for local reception.

During the frame interval between bursts destined for local reception, the slow-speed processing means $31_1$ sequentially reads out the stored information associated with the samples of the last received burst of information destined for local reception. Slow-speed processing means $31_1$ uses the stored information associated with a burst of information to regenerate the received burst signal and to digitally perform, for example, carrier and clock recovery, start-of-message identification, matched filtering, equalization, decoding, data detection, etc., as was normally performed in the prior art by high-speed analog and digital processing equipment before storage in a memory. The slow-speed processing means $31_1$, in performing true carrier recovery, can determine the frequency and phase difference between the received carrier and the carrier generated by local oscillator 21. Such frequency and phase difference can, for example, then be conveyed to local oscillator 21 for adjusting its frequency and phase accordingly for subsequent bursts. The speed of the slow-speed processor must be only high enough that processing of a burst is completed before the next burst in the sequence of periodic bursts corresponding to that time slot in the TDMA frame arrives.

It is advantageous to be able to separate the burst demodulator as described hereinbefore into two or more modules to permit, among other things, economy of growth. As can be seen from the prior discussion, the first module 10 is primarily concerned with the high-speed processing of downconverting a received TDMA sequence to baseband and sampling the analog signal at a predetermined rate without being concerned with the burst information. The second module $11_1$ then functions to reconstruct the analog burst signal and perform the processing of the burst information at a slow speed prior to the arrival of another burst in the next frame. From the above discussion, it can be seen that for purposes of start-up, if, for example, a terminal initially has only one burst destined for local reception in each frame, then only a first module 10 and a second module $11_1$ need be provided.

If at a later time a second burst of information in each frame is required for local reception at this terminal, then only an additional second module $11_2$ need be provided comprising memory $30_2$ and slow-speed processing means $31_2$. Module 10 still functions to provide digital output signals for all samples in all the bursts in a frame period and will transmit this information to the input of each of memories $30_1$ and $30_2$. Such memories will not store this information unless enabled by window generator 25. Therefore, it is only required to have window generator 25 provide a first enabling and disabling signal to memory $30_1$ when the first burst destined for local reception in a frame period arrives, and then provide a second enabling and disabling signal to memory $30_2$ when the second burst destined for local reception arrives in each frame. It follows that for each additional burst per frame that will be required for local reception, it is only necessary to add another second module and require that window generator 25 provide the appropriate enabling and disabling signal to that next second module $11_i$.

It is to be understood that, preferably, the analog input signal should be sampled at a rate sufficiently high that the total samples contain essentially all of the information needed to reconstruct the original signal. For a band-limited signal, this would imply a rate at least the Nyquist rate as is well known from sampling theory. However, this is not a limitation of the present invention, since if some degradation in the received signal is permitted, sampling can be accomplished at a lesser rate in both band-limited or non-band-limited signals.

What is claimed is:

1. A burst demodulator for digitally modulated signals comprising:

a local oscillator for generating an autonomous predetermined carrier frequency;

means, responsive to a digitally modulated radio frequency (r-f) input signal and the predetermined carrier frequency from the local oscillator, which carrier frequency is asynchronous and nominally approximates a carrier frequency used to obtain the r-f input signal, for downconverting the r-f input signal to a baseband output signal, the r-f input signal comprising a plurality of sequential bursts of information within a predetermined time period which include one or more predetermined bursts of information which are destined for the burst demodulator;

means, responsive to the baseband output signal from the downconverting means, for sampling the baseband output signal at a predetermined rate which is autonomous from the bit clock of the r-f input signal and at a frequency which is at least twice that of the baseband output signal spectrum, to generate a plurality of associated analog signal samples;

means for converting each of the plurality of analog signal samples from the sampling means into a separate representative digital signal, such representative digital signal corresponding to a level of each sample and not to a final determination of any discrete information digit originally modulated onto a carrier forming the digitally modulated input signals received by the burst demodulator; and means for storing each of the separate representative digital signals associated with a first predetermined burst of information destined for the burst demodulator in each frame period for subsequent slow-speed processing to recover the discrete information digits.

2. A burst demodulator according to claim 1 wherein the demodulator further comprises:

means, responsive to a detection of a beginning of a frame period, for generating a separate enabling signal to the storing means during a time interval within the frame period when the representative digital signals from the converting means associated with the first predetermined one of the bursts of information in a frame period destined for the burst demodulator is available to the storing means.

3. A burst demodulator according to claim 1 wherein the demodulator further comprises:

slow-speed processing means responsive to the representative digital signals associated with the first predetermined burst of information stored in the storing means, for determining therefrom information conferred within the first predetermined burst of information.

4. A burst demodulator according to claim 1 wherein the demodulator comprises:

separate storing means for each separate predetermined burst of information in each frame period destined for the burst demodulator.

5. A burst demodulator according to claim 4 wherein the demodulator further comprises:

separate slow-speed processing means for each burst of information destined for the burst demodulator in each frame period, each separate slow-speed processing means being responsive to the representative digital signals of a separate predetermined burst of information in each frame period which is stored in a separate one of the storing means for determining therefrom information conferred within the associated burst of information.

6. A burst demodulator according to claim 5 wherein the burst demodulator further comprises:

means, responsive to a detection of a beginning of a frame period, for generating a separate enabling signal to each of the separate storing means during a time interval when the representative digital signals from the converting means associated with a predetermined one of the separate bursts of information in a frame period destined for the burst demodulator are available to said separate storing means.

* * * * *